Oct. 21, 1924.  
F. W. SUTTON  
1,512,651  
TRACTION PULLING AND LIFTING DEVICE  
Filed March 24, 1923

INVENTOR  
Frank W Sutton

Patented Oct. 21, 1924.　　　　　　　　　　　　　　1,512,651

UNITED STATES PATENT OFFICE.

FRANK W. SUTTON, OF BRISTOW, OKLAHOMA.

TRACTION PULLING AND LIFTING DEVICE.

Application filed March 24, 1923. Serial No. 627,513.

*To all whom it may concern:*

Be it known that I, FRANK W. SUTTON, a citizen of the United States, residing at Bristow, in the county of Creek and State of Oklahoma, have invented a certain new and useful Invention in Traction Pulling and Lifting Devices, of which the following is a specification, reference being had to the accompanying drawings.

This invention relates to new and useful improvements in traction pulling and lifting devices.

An important object of the invention is to provide a lifting and pulling means which is of such a construction that it may be readily associated with and operated by many standard makes of power units, preferably of the tractor type.

A further object of the invention is to provide a device of the above mentioned type which contemplates the use of the speed changing mechanism usually forming a part of the above mentioned type of power unit for varying the lifting or pulling force created by my lifting and pulling device in proportion with any changes in the load applied thereto.

A still further object of the invention is to provide an improved form of control for the above mentioned device.

Other objects and advantages of the invention will be apparent during the course of the following description.

Figure 1:
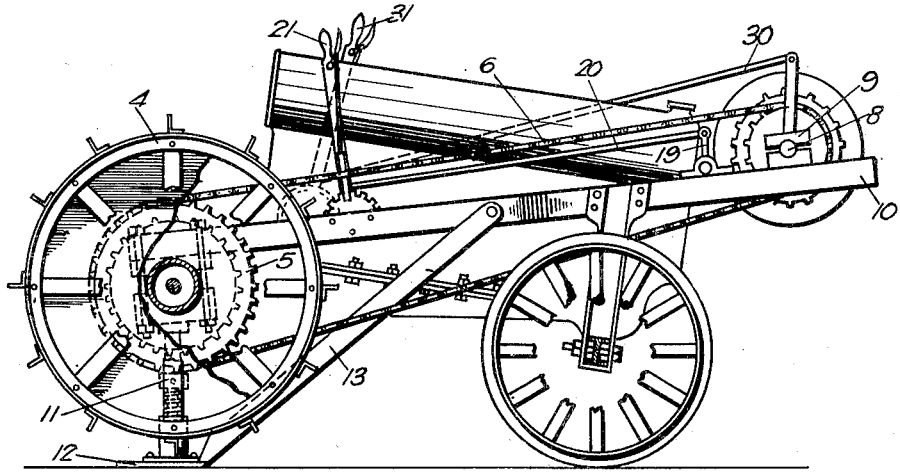
Figure 2:
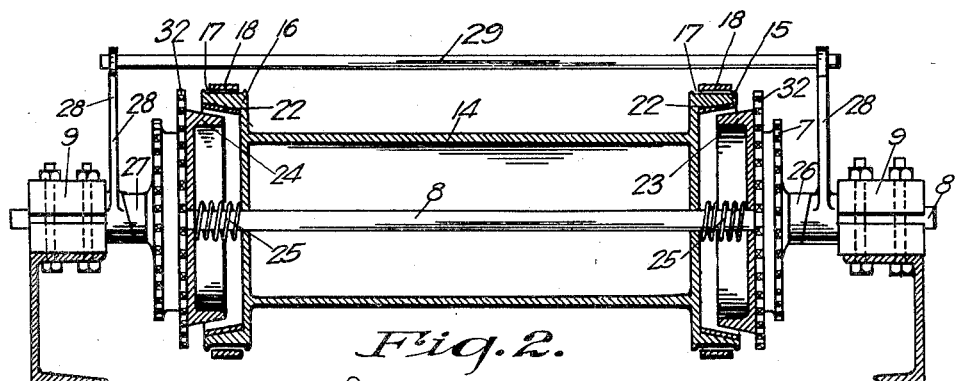
Figure 3:
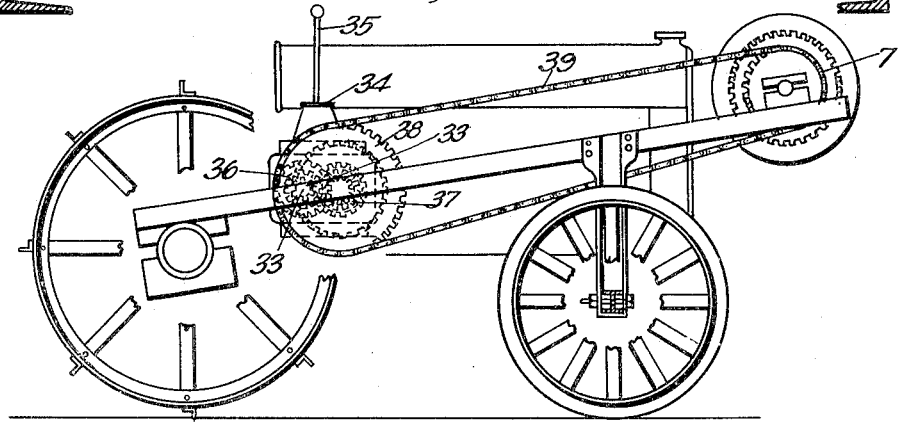

In the accompanying drawing forming a part of this specification and in which like numerals are employed to designate like parts throughout the same, Figure 1 is a side elevational view, partly broken away, of a Fordson tractor to which my improved pulling and lifting device is properly attached and shows the device as being driven by the rear axle of the tractor with the said axle and its ground engaging wheels maintained in an abnormal, elevated position in respect to the ground, Figure 2 is an enlarged, partly sectional and partly elevational, view of the power pulling or lifting device, and Figure 3 indicates an elevational view of the power unit, the pulling and lifting device, and the said auxiliary transmission for variability of speeds from the one-speed auxiliary shaft.

In these several views, similar characters of reference will indicate similar parts.

Without any special reference to the construction, type and arrangement of the power unit, which may be of any type, preferably in this instance, as before noted, a "Fordson tractor," so called, the tractor drive wheels 4 are provided with sprocket wheels 5, so that as the wheels 4 turn, power may be taken therefrom by chains 6 which lead to sprocket wheels 7 running idly on a shaft 8. A suitable, auxiliary frame 10 extending forwardly of the tractor is provided and carries the bearings 9 within which the shaft 8 is journaled.

In order that the tractor wheels 4 may be propelled for the purpose intended, jacks 11 may be provided and suitably secured in place upon platforms or shoes 12, which for rigidity may be braced by arms 13 secured to the body of the power unit or tractor. By the use of this simple means the tractor or power unit wheels may be made to clear the surface and run freely, at will.

Mounted idly on the shaft 8 is a drum 14, upon which cable may be stored and the ends of this drum are provided with clutch jaws of the tapering order, indicated in a general way by 15 and 16, each in the present instance being also provided with a brake band race 17 to receive brake bands 18, to be suitably operated or controlled by a link 19, attached to a rod 20 to be operated by a lever 21, all being suitably segmented, and journalled for action in the usual mechanical manner, the details whereof need no emphasis here.

These clutch elements attached to said drum may, of course, be properly provided with a suitable lining 22, as seen for instance in Figure 2.

Associated, in any suitable manner with the sprocket wheels 7 aforementioned (see Figure 2) are clutch members 23 and 24 which are complementary to those referred to by numerals 15 and 16, and are to be normally held in their inoperative position by the intervention of convoluted springs 25 between their inner face and the adjacent faces of the members 15 and 16 aforesaid. (Still see Figure 2.)

Between each bearing 9 and the adjacent clutch member 23 or 24 are clutch shifting members 26 and 27, to one element of each of which is applied a lever 28, in the present instance tied by a rod 29 and to this construction is applied rods 30, leading back to a control lever 31, all suitably segmented and journaled for action, in the usual mechanical manner. When the levers 28 are moved, as will be readily seen in Figure 2, the action will be to force the clutches 23 and 24 into operative engagement with the clutches 15 and 16, and the power inherent in the former by virtue of connection with power through the chain drive, will operate the drum 14 in suitable direction, under suitable speed.

It is to be understood, of course, in this connection that the usual transmission employed in the power unit aforesaid with its attendant variable speed device, will be employed to gain the results desired for power and variable speed in the drum.

Now then, it may be that for loads of variable capacity, it might be wise to change the ratio between the sprockets 5 and those attached to the clutch members 23 and 24, so that, in addition to those mentioned—the sprockets 7, there may also be applied sprockets 32 for the purposes intended.

We will now observe that there may be in power units an auxiliary power shaft, such as that marked 33 in Fig. 3, which is of the one speed order, and it may be desirable to utilize such a shaft so that the power unit or tractor traction wheels need not be raised from the ground. In order to do this, however, it will become necessary to make an application to this shaft 33, of a suitable and practical form of variable speed arrangement indicated in a general way by 34, controllable by a gear shift 35, the application of which will be in a usual and mechanical manner, best suited to manufacturer, and with which application those skilled in the art are familiar.

This shaft 33 is provided with a pinion 36, meshing with a gear 37 driving a sprocket 38, and chain 39 delivering its power to the sprockets 7 and developing the same efficiency as hereto mentioned in connection with the pulling or lifting apparatus, hereinbefore described.

There are a number of advantages attending this invention, among which, and of salient importance may be mentioned the variation of speed and power commensurate with conditions and load to be taken into consideration either in pulling or lifting. This happens to be particularly true in lifting casing or tubing from wells of great depth. At first the load is great, lessening as the sections come forth, needing therefore not the original conditions of power and speed, but the same can be materially modified to the advantage of economy and efficiency in service. The variation of the weight of cable as it is stored on the drum in service is a consideration worth while, separate and distinct from the lessened load as distance is absorbed.

Having thus described this invention I claim:

1. The combination with a power unit having a power shaft and a plurality of different sized sprocket wheels carried by said shaft adjacent each end thereof, of a supporting frame, a shaft carried by said frame, a drum loosely carried by the last mentioned shaft, a concentrically arranged, combination brake band race and female clutch unit formed integrally with each end of said drum, a combination unitary structure loosely mounted on the shaft carried by said supporting frame outwardly of each end of said drum and resiliently retained in spaced relation thereto, said combination unitary structures each consisting of a male cone clutch unit and a plurality of different sized sprocket wheels formed integrally with each other; a brake band associated with each brake band race, means for operating said brake bands in unison, a sprocket chain operatively connecting the sprocket wheels carried by the adjacent ends of said shafts, and means for moving said combination unitary structures in unison toward said drum ends for connecting said drum to said power shaft by operatively connecting said cone clutch units.

2. The combination with a power unit having a power shaft and a plurality of different sized sprocket wheels carried by said shaft adjacent each end thereof, of an auxiliary supporting frame, a pair of bearings carried by the sides of said frame, a shaft journaled in said bearings, a drum loosely mounted on the last mentioned shaft, a combination brake band race and female clutch unit formed integrally with each end of said drum, a combination unitary structure loosely mounted on the shaft journaled in said bearings and positioned between each end of said drum and one of said bearings, a spring encircling said shaft and positioned between each combination unitary structure and its adjacent drum end for retaining said elements normally spaced apart, said combination unitary structures each comprising a male cone clutch unit, a plurality of different sized sprocket wheels, and a drum cam formed integrally, the said cone clutch element being positioned adjacent the end of said drum and the drum cam adjacent said bearing; a brake band associated with each brake band race, means for operating said brake bands in unison, a sprocket chain operatively connecting the sprocket wheels carried by the adjacent ends of said shaft, a complemental drum cam loosely mounted on the shaft between each bearing and the drum cam formed with the adjacent combination unitary structure, and means for rotating the complemental drum cams in unison for connecting said drum to said power shaft by shifting said combination unitary structures to operatively connect said cone clutch units.

Signed at Oklahoma, in the county of Oklahoma and State of Oklahoma, this 14th day of February, in the year of our Lord nineteen hundred and twenty-three.

FRANK W. SUTTON.